United States Patent
Washiro

(10) Patent No.: US 10,074,992 B2
(45) Date of Patent: Sep. 11, 2018

(54) BATTERY DEVICE, BATTERY MANAGEMENT METHOD, AND ELECTRONIC APPARATUS

(75) Inventor: Takanori Washiro, Kanagawa (JP)

(73) Assignee: Sony Corporation, Tokyo (JP)

( * ) Notice: Subject to any disclaimer, the term of this patent is extended or adjusted under 35 U.S.C. 154(b) by 340 days.

(21) Appl. No.: 13/984,302

(22) PCT Filed: Feb. 14, 2012

(86) PCT No.: PCT/JP2012/053439
§ 371 (c)(1),
(2), (4) Date: Aug. 8, 2013

(87) PCT Pub. No.: WO2012/114950
PCT Pub. Date: Aug. 30, 2012

(65) Prior Publication Data
US 2013/0314048 A1    Nov. 28, 2013

(30) Foreign Application Priority Data
Feb. 23, 2011  (JP) ................. 2011-037395

(51) Int. Cl.
*H02J 7/00* (2006.01)
*H02J 5/00* (2016.01)
(Continued)

(52) U.S. Cl.
CPC .............. *H02J 5/00* (2013.01); *H01M 10/425* (2013.01); *H02J 7/0004* (2013.01);
(Continued)

(58) Field of Classification Search
USPC ........................................................ 320/128
See application file for complete search history.

(56) References Cited

U.S. PATENT DOCUMENTS

| | | | |
|---|---|---|---|
| 2003/0076221 A1* | 4/2003 | Akiyama | H04L 12/40182 340/12.32 |
| 2006/0132089 A1* | 6/2006 | Ambrosio | H02J 7/0014 320/107 |

(Continued)

FOREIGN PATENT DOCUMENTS

| | | |
|---|---|---|
| JP | 11-318033 | 11/1999 |
| JP | 3289320 | 3/2002 |

(Continued)

*Primary Examiner* — Mohammed Alam
(74) *Attorney, Agent, or Firm* — Chip Law Group

(57) ABSTRACT

The present technique relates to a battery device, a battery management method, and an electronic apparatus that can easily manage a battery device formed with a large number of battery cells. When a battery (51) has capacitive properties (or when the equivalent circuit of the battery (51) for an AC signal at a frequency f is a capacitor (51C)), a series circuit formed with a capacitor (171) and a coil (172) (=a coil (172-1)+a coil (172-2)) is provided in parallel to the battery (51), to form a blocking filter. The capacitor (171) and the coil (172-1) form a series resonance circuit. The capacitor (51C) and the coil (172-2) form a parallel resonance circuit. The present invention can be applied to an electronic apparatus that includes a large number of battery cells, for example.

12 Claims, 8 Drawing Sheets

(51) Int. Cl.
*H01M 10/42* (2006.01)
*H02J 13/00* (2006.01)
*H04B 3/56* (2006.01)

(52) U.S. Cl.
CPC .... *H01M 2010/4278* (2013.01); *H02J 13/002* (2013.01); *H02J 2007/0096* (2013.01); *H04B 3/56* (2013.01); *H04B 2203/5416* (2013.01); *H04B 2203/5491* (2013.01); *Y02B 90/2615* (2013.01); *Y02B 90/2692* (2013.01); *Y04S 40/121* (2013.01); *Y04S 40/146* (2013.01)

(56) References Cited

U.S. PATENT DOCUMENTS

| 2009/0039833 | A1* | 2/2009 | Kitagawa | H01M 10/46 320/134 |
|---|---|---|---|---|
| 2010/0083012 | A1* | 4/2010 | Corbridge | G06F 1/1632 713/300 |
| 2011/0069766 | A1* | 3/2011 | Takahashi | H04B 3/548 375/257 |
| 2011/0205035 | A1* | 8/2011 | Abe | H04B 3/548 340/13.23 |
| 2012/0139477 | A1* | 6/2012 | Oglesbee | H02J 7/00 320/107 |
| 2013/0002208 | A1* | 1/2013 | Rozenboim | H02J 7/0021 320/162 |
| 2013/0063255 | A1 | 3/2013 | Washiro | |
| 2013/0065552 | A1 | 3/2013 | Soma et al. | |
| 2013/0093395 | A1* | 4/2013 | Liu | H02J 7/0019 320/118 |
| 2013/0307484 | A1* | 11/2013 | Washiro | H02J 7/02 320/128 |
| 2013/0335105 | A1 | 12/2013 | Washiro | |

FOREIGN PATENT DOCUMENTS

| JP | 2006-510330 | 3/2006 |
|---|---|---|
| JP | 2007-240521 | 9/2007 |
| JP | 2008-206272 | 9/2008 |
| JP | 2009-051079 | 3/2009 |
| WO | WO 2006/115037 | 11/2006 |
| WO | WO 2010/035545 | 4/2010 |

* cited by examiner

BATTERY DEVICE, BATTERY MANAGEMENT METHOD, AND ELECTRONIC APPARATUS

TECHNICAL FIELD

This disclosure relates to battery devices, battery management methods, and electronic apparatuses, and more particularly, to a battery device that is designed to communicate information via power lines, a battery management method, and an electronic apparatus.

BACKGROUND ART

In recent years, battery devices are used in various products. When the amount of power to be used is large, the battery capacity also needs to be large. As the capacities of such battery devices are becoming larger, security and reliability are expected to be ensured.

As the capacities of battery devices become larger, the number of battery cells in each of the battery devices also becomes larger, and the price thereof becomes higher. Therefore, there is a possibility that a user takes apart a battery device, and replaces the internal battery cells with less expensive ones without authorization.

The applicant has previously suggested that IC chips should be provided in a battery device, and an identification number should be stored in each of the IC chips (Patent Document 1, for example). With this structure, the identification numbers are read from the battery device, and authenticating operations are performed based on the read identification numbers. In this manner, unauthorized battery devices can be spotted, and then be eliminated.

CITATION LIST

Patent Document

Patent Document 1: Japanese Patent Publication No. 3289320

SUMMARY OF THE INVENTION

Problems to be Solved by the Invention

In the previously suggested battery device, an information terminal is provided independently of the terminal for supplying power, and identification information is read from the information terminal.

As a result, the same number of information terminals as the number of battery cells need to be provided to read the identification information from the respective IC chips provided in the battery cells housed in the battery device. In the case of an electric vehicle, for example, 100 or more battery cells need to be connected in series, and therefore, securing communication lines becomes difficult. Also, the battery device becomes larger in size, and the costs become higher. As a result, it becomes difficult to realize a battery device that can be easily managed.

This disclosure is being made in view of the above circumstances, and the object thereof is to easily manage a battery device formed with a large number of battery cells.

Solutions to Problems

A battery device as a first aspect of this disclosure includes: a battery that outputs DC power via a power line; a storage element that outputs stored battery information by performing load modulation on an AC signal transmitted/received via the power line, the storage element being connected in parallel to the battery; and a blocking filter forming unit that forms a blocking filter with the battery, the blocking filter blocking the AC signal from being input to the battery.

The blocking filter forming unit may be connected in parallel to the battery.

When the equivalent circuit of the battery for the AC signal is a first capacitor having a capacitance C1, the blocking filter forming unit may be formed with a series circuit including a second capacitor having a capacitance C2 and a first coil having an inductance L1.

When the first coil is regarded as a series connection of a second coil having an inductance L11 and a third coil having an inductance L12, the second capacitor and the second coil may form a series resonance circuit for the AC signal at a frequency f, satisfying $2\pi f=1/\sqrt{(C2 \cdot L11)}$, and the first capacitor and the third coil may form a parallel resonance circuit for the AC signal at the frequency f, satisfying $2\pi f=1/\sqrt{(C1 \cdot L12)}$.

When the equivalent circuit of the battery for the AC signal is a first coil having an inductance L1, the blocking filter forming unit may be formed with a first capacitor having a capacitance C1.

The first coil and the first capacitor may form a parallel resonance circuit for the AC signal at the frequency f, satisfying $2\pi f=1/\sqrt{(L1 \cdot C1)}$.

The battery device may be formed with battery cells each including the battery, the storage element, and the blocking filter forming unit.

A battery management method as the first aspect of this disclosure is a battery management method for a battery device that includes a battery, a storage element, and a blocking filter forming unit. The battery management method includes: outputting DC power from the battery via a power line; outputting stored battery information via the power line by performing load modulation on an AC signal transmitted/received via the power line, the outputting being performed by the storage element; and blocking the AC signal from being input to the battery, the blocking being performed by the blocking filter.

In the first aspect of this disclosure, the DC power from the battery is output via the power line, and the battery information is output via the power line as load modulation is performed on the AC signal transmitted/received via the power line. Further, the blocking filter blocks the AC signal from being input to the battery.

An electronic apparatus as a second aspect of this disclosure includes: a battery device that includes: a battery that outputs DC power via a power line; a storage element that outputs stored battery information via the power line by performing load modulation on an AC signal transmitted/received via the power line, the storage element being connected in parallel to the battery; and a blocking filter forming unit that forms a blocking filter with the battery, the blocking filter blocking the AC signal from being input to the battery; an operating unit that performs a predetermined operation by using the power supplied from the battery device; and a management device that acquires the battery information by communicating the AC signal to and from the storage element via the power line, and controls the power supply from the battery device to the operating unit based on the acquired battery information.

In the second aspect of this disclosure, the DC power from the battery is output via the power line, and the battery information is output via the power line as load modulation is performed on the AC signal transmitted/received via the power line. Further, the blocking filter blocks the AC signal from being input to the battery. Also, the power supply from the battery device to the operating unit is controlled based on the acquired battery information.

Effects of the Invention

According to the first aspect of this disclosure, a battery device that is easily managed can be realized.

According to the second aspect of this disclosure, an electronic apparatus that easily manages a battery device formed with a large number of battery cells can be realized.

MODES FOR CARRYING OUT THE INVENTION

The following is a description of modes (hereinafter referred to as embodiments) for carrying out the invention.
<1. Description of the Principles>
[Fundamental Structure of an Electronic Apparatus]

Figure 1:
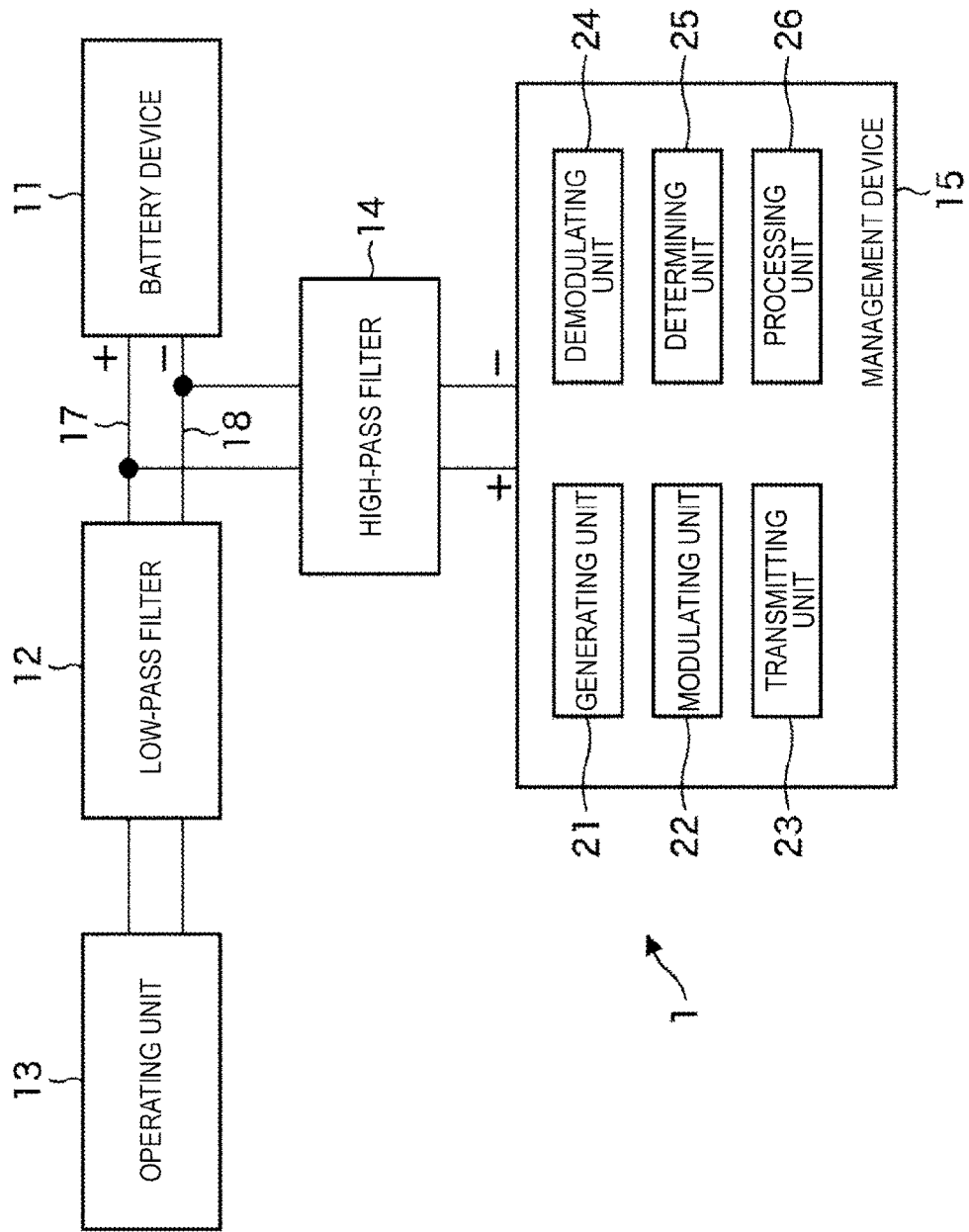
FIG. 1 is a block diagram showing a fundamental structure of an electronic apparatus to which the present invention is applied.

FIG. 1 shows a fundamental structure of an electronic apparatus that is an embodiment. This electronic apparatus 1 is formed with a battery device 11, a low-pass filter 12, an operating unit 13, a high-pass filter 14, and a management device 15.

The battery device 11 includes one or more battery cells (such as the battery cell 31-1 shown in FIG. 2) provided therein, and supplies DC voltage/DC current, or DC power, to the operating unit 13 via power lines 17 and 18. The operating unit 13 receives the supply of DC power from the battery device 11 via the low-pass filter 12, and performs various kinds of operations. For example, when the electronic apparatus 1 is regarded as an electric vehicle (EV), the operating unit 13 is equivalent to the motor that rotationally drives the tires. The battery device 11 can be formed as a battery pack, for example.

The low-pass filter 12 is placed on the power lines 17 and 18 between the battery device 11 and the operating unit 13, and can supply DC power to the operating unit 13 that is a block that operates with the DC power. The low-pass filter 12 blocks an AC signal that is generated by the management device 15 and is transmitted via the power lines 17 and 18, to prevent the AC signal from entering the operating unit 13 that operates with DC power and breaking the operating unit 13.

The high-pass filter 14 passes the AC signal generated by the management device 15 to the battery device 11 via the power lines 17 and 18. The high-pass filter 14 also blocks the DC power transmitted via the power lines 17 and 18, and prevents the DC power from breaking the management device 15 that operates with AC power.

The management device 15 manages the battery device 11 by communicating the AC signal to and from the battery device 11 via the power lines 17 and 18. The management device 15 includes the functional blocks of a generating unit 21, a modulating unit 22, a transmitting unit 23, a demodulating unit 24, a determining unit 25, and a processing unit 26.

The generating unit 21 generates a command for an IC chip 53 (FIG. 2) of the battery device 11. The modulating unit 22 modulates a carrier wave in accordance with the generated command, and outputs the modulated carrier wave as the AC signal. The carrier wave may be a high-frequency signal (also referred to as a RF signal) having a frequency f of 13.56 MHz, for example. The frequency f of the AC signal is not limited to 13.56 MHz, and any frequency may be used. The transmitting unit 23 outputs the AC signal to the power lines 17 and 18.

The demodulating unit 24 demodulates the reflected wave of the AC signal formed by subjecting the carrier wave to load modulation performed by the IC chip 53 of the battery device 11 based on reply information. The determining unit 25 performs various kinds of determining operations based on the demodulated reply information. The processing unit 26 performs various kinds of processing operations based on determination results.

<2. First Embodiment>
[First Example Structure of a Battery Cell]

Figure 2:
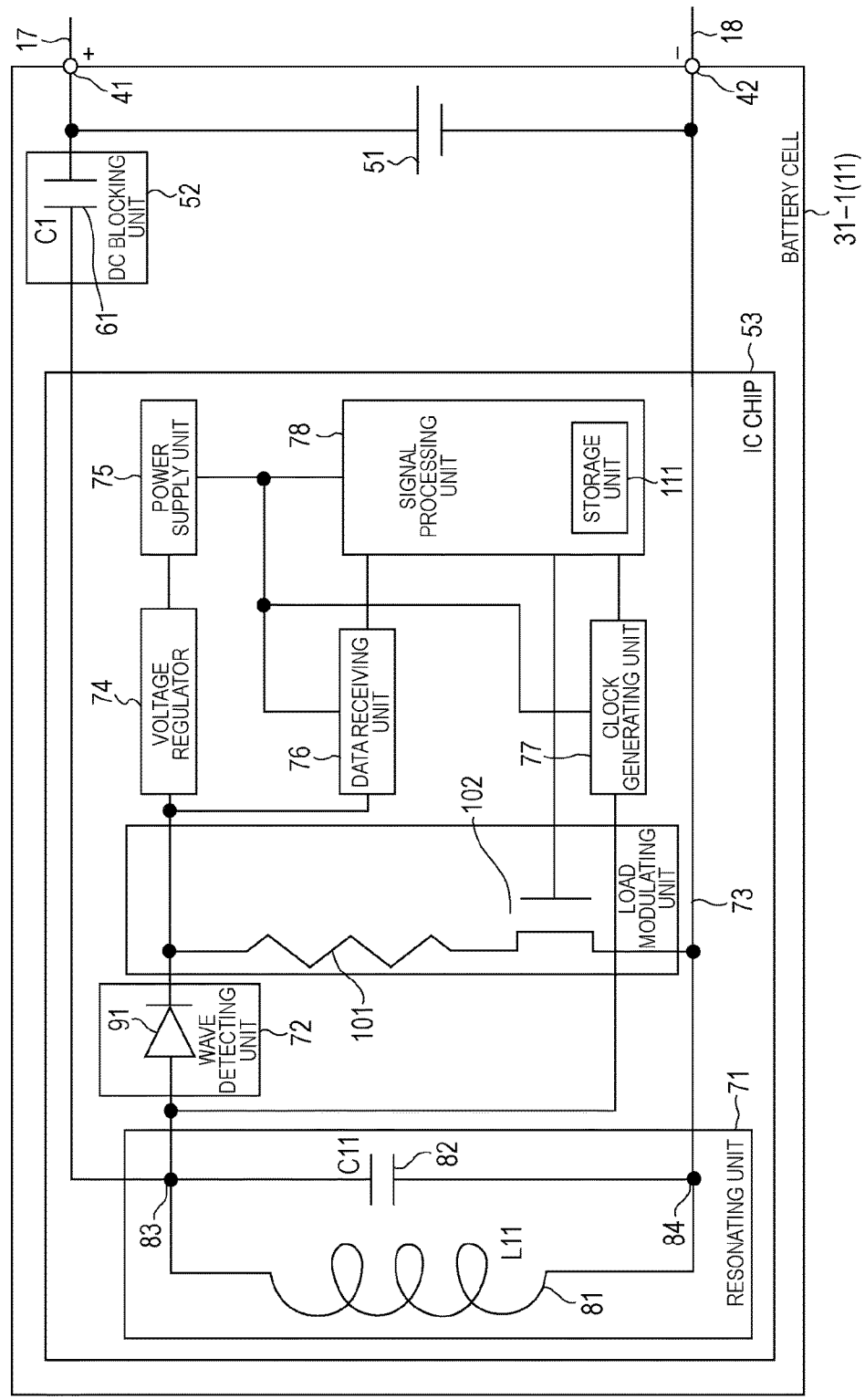
FIG. 2 is a block diagram showing a first example structure of a battery cell.

Next, an example structure of the battery device 11 is described. As described above, the battery device 11 is formed with one or more battery cells. FIG. 2 shows a first example structure of a battery cell of the battery device 11.

This battery cell 31-1 is formed with a battery 51, a DC blocking unit 52, and the IC chip 53.

The battery 51 outputs a positive voltage from a positive terminal 41 to the power line 17, and outputs a negative voltage from a negative terminal 42 to the power line 18. The battery 51 is a secondary battery that can be charged. That is, the power lines 17 and 18 serve as the passages for DC current/DC voltage at the time of charging or discharging.

The DC blocking unit 52 has the function to supply the AC signal supplied from the management device 15 via the power lines 17 and 18, to the IC chip 53. The DC blocking unit 52 also blocks DC power from entering the IC chip 53 through the power line 17. In this manner, the IC chip 53 is prevented from breaking down due to an input of DC power. The DC blocking unit 52 is formed with a capacitor 61 having a capacitance C1. The capacitor 61 is placed between the positive terminal 41 and the positive voltage supply point 83 of the IC chip 53.

The IC chip 53 as a storage element can be formed with an electronic tag, such as an IC chip or a tag compliant with various standards. For example, while an electronic tag compliant with standards such as RFID (Radio Frequency Identification), Mifare, FeliCa, and NFC (Near Field Communication) (all of which are registered trade names) can of course be used, an electronic tag that is not compliant with any of those standards and has a unique structure may also be prepared. The storage element preferably has the function to read and output at least the information stored therein with the AC signal, and further has the function to store supplied information. The storage element maybe of either a passive type or an active type.

In the case illustrated in FIG. 2, the IC chip 53 is formed with a resonating unit 71, a wave detecting unit 72, a load modulating unit 73, a voltage regulator 74, a power supply unit 75, a data receiving unit 76, a clock generating unit 77, and a signal processing unit 78.

The resonating unit 71 is a parallel resonance circuit formed with a coil 81 having an inductance L11 and a capacitor 82 having a capacitance C11. One of the connecting points between the coil 81 and the capacitor 82 is the positive voltage supply point 83, and the other one of the connecting points is a negative voltage supply point 84. The values of the inductance L11 and the capacitance C11 are set so that the resonance frequency becomes 13.56 MHz. That is, the resonating unit 71 including the coil 81 functions as an antenna and also has the function to generate an AC inductive voltage through electromagnetic induction when the AC signal having the frequency f of 13.56 MHz is wirelessly communicated.

In this embodiment, however, the AC signal having the frequency f of 13.56 MHz is not wirelessly communicated, but is supplied from the management device 15 via a cable (the power lines 17 and 18). In view of this, the resonating unit 71 or at least the coil 81 may be eliminated. In this manner, false operations due to influence of nearby metal or the like can be prevented. In this case, the AC signal that is input via the power lines 17 and 18 is input directly to the wave detecting unit 72. Where the resonating unit 71 is not eliminated, the resonating unit 71 resonates with the AC signal having the frequency f of 13.56 MHz when the AC signal is input, and voltages are generated from the voltage supply points 83 and 84.

The wave detecting unit 72 is formed with a diode 91, for example. In this case, the anode of the diode 91 is connected to the positive voltage supply point 83, and the cathode is connected to one end of a resistor 101 of the load modulating unit 73. The diode 91 rectifies the AC inductive voltage from the positive voltage supply point 83 to a DC inductive voltage, and demodulates the signals contained in the AC signal (a carrier wave) transmitted from a reader/writer 291-11. One end of a FET (Field Effect Transistor) 102 that forms the load modulating unit 73 with the resistor 101 is connected to the other end of the resistor 101. The FET 102 as a switching element may be either a p-channel FET or an n-channel FET. It is also possible to use a bipolar transistor.

The voltage regulator 74 smoothes the voltage rectified by the diode 91, and turns the smoothed voltage into a constant voltage. The constant voltage is then supplied to the power supply unit 75. The power supply unit 75 distributes generated power to the data receiving unit 76, the clock generating unit 77, the signal processing unit 78, and the like.

The data receiving unit 76 extracts and amplifies (or demodulates the amplitude of) the low-frequency component from the half-wave rectified voltage that is output from the diode 91, generates a data signal that is binarized at the high level and the low level, and is then supplied to the signal processing unit 78. The clock generating unit 77 generates a rectangular clock signal from the AC signal supplied from the voltage supply point 83, and supplies the clock signal to the signal processing unit 78.

The signal processing unit 78 reads the data signal in synchronization with the clock signal. Based on battery information stored in a storage unit 111 provided inside, the signal processing unit 78 generates a response signal that is binarized at the high level and the low level, and outputs the response signal to the gate of the FET 102. The FET 102 is switched on or off in accordance with the response signal.

In this manner, load modulation to change the impedance seen from the voltage supply points 83 and 84 is performed. The battery information contains at least the identification information about the battery cell 31-1. The battery information can further contain specification information, history information, and billing information about the battery cell 31-1. Also, the IC chip 53 may have the function to detect the status (temperature, voltage, or the like) of the battery 51, and the battery information may further contain the detection result.

[Second Example Structure of a Battery Cell]

Figure 3:
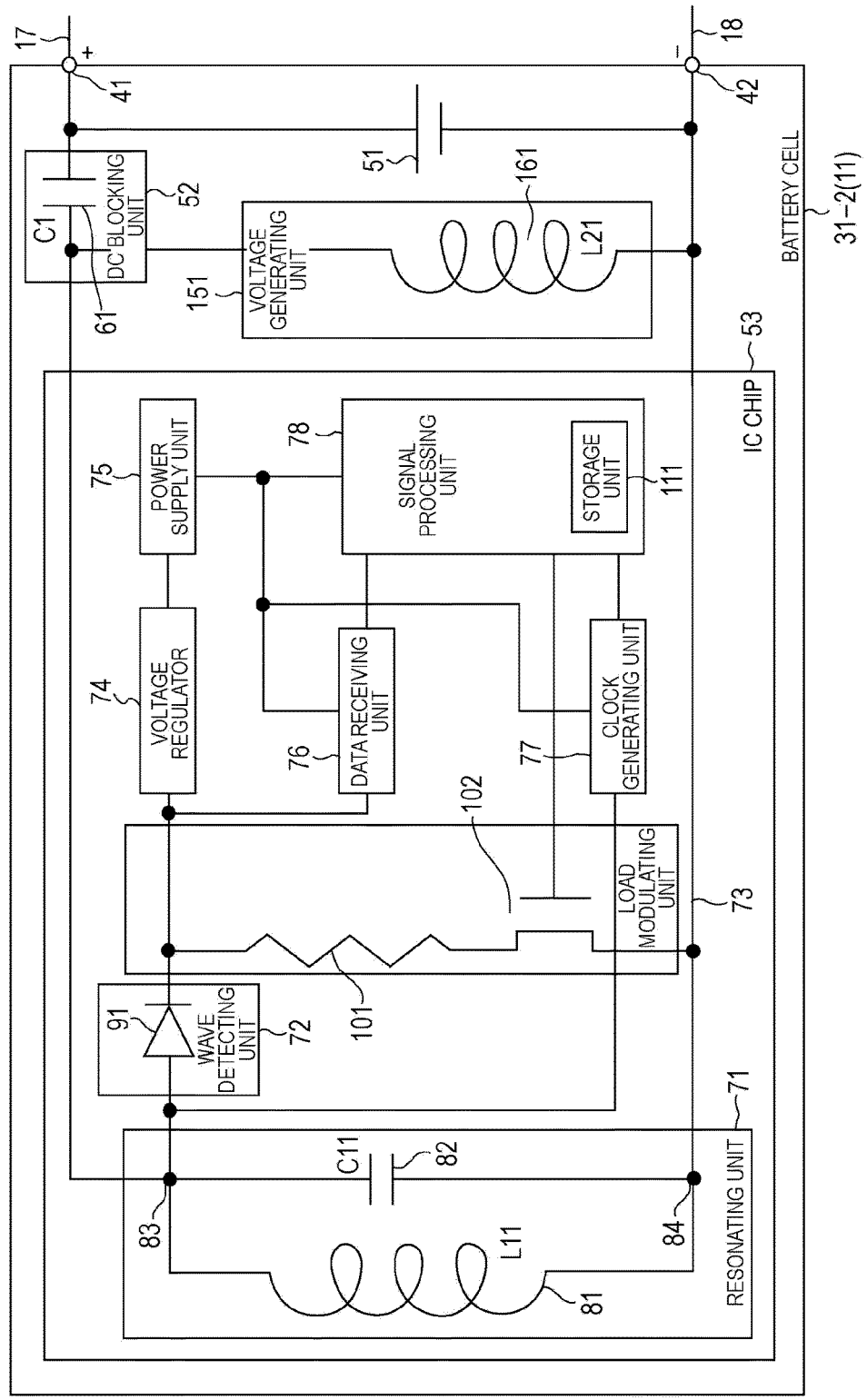
FIG. 3 is a block diagram showing a second example structure of a battery cell.

FIG. 3 shows a second example structure of a battery cell of the battery device 11. This battery cell 31-2 is the same as the first example structure shown in FIG. 2, except that a voltage generating unit 151 is added between the voltage supply points 83 and 84. The other components are the same as those of the first example structure, and therefore, explanation of them will not be repeated herein.

The voltage generating unit 151 is formed with a coil 161 having an inductance L21. The coil 161 generates voltage when the AC signal from the management device 15 is input via the power lines 17 and 18 and the capacitor 61. The generated voltage is supplied to the voltage supply points 83 and 84. The inductance L21 of the coil 161 and the capacitance C1 of the capacitor 61 can be set so that the coil 161 and the capacitor 61 forma series resonance circuit that resonates with the AC signal having the frequency f of 13.56 MHz.

In the case of the second example structure, voltage is generated at both the resonating unit 71 and the voltage generating unit 151. Accordingly, voltage can be generated with higher certainty than in the first example structure. Therefore, in a case where the battery device 11 is formed with battery cells 31 connected in series, and the AC signal is communicated to each battery cell 31 via the power lines 17 and 18, the second example structure is more beneficial than the first example structure.

In the battery cell 31-2 that is the second example structure, the AC signal from the management device 15 is also input to the battery 51 via the power lines 17 and 18. The same applies in the battery cell 31-1 that is the first example structure illustrated in FIG. 2.

Figure 4:
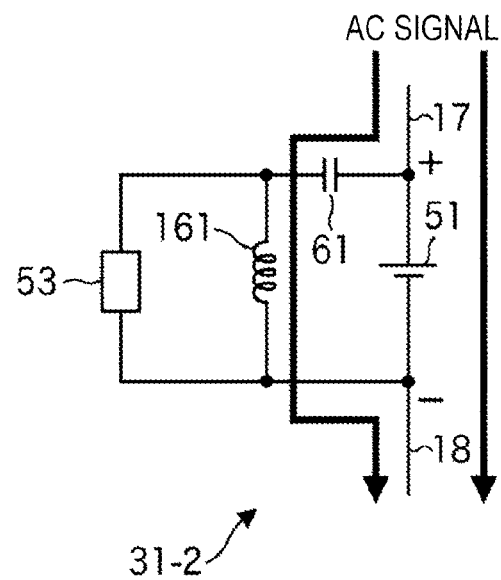
FIG. 4 is a diagram showing an AC signal flow in the second example structure of a battery cell.

FIG. 4 shows the flow of the AC signal in the battery cell 31-2 as the second example structure. However, the IC chip 53 is simplified in the drawing. The same applies in FIG. 5 and the other drawings that will be referred to later.

In the battery cell 31-2 as the second example structure, the AC signal passes through not only the passage formed with the capacitor 61 and the coil 161 on the IC chip side, but also a passage inside the battery 51.

That is, where the entire battery cell 31-1 is regarded as an equivalent circuit only for the AC signal at the frequency f, the terminals of the battery 51 are almost short-circuited, and therefore, the AC signal that passes through the passage on the IC chip side decreases. As a result, the voltage generated as the drive power for the IC chip 53 becomes lower, and might lead to a decrease in the AC signal reading sensitivity of the IC chip 53.

This does not cause any problem in practice, when the battery device 11 is formed with one to several battery cells 31. However, when the battery device 11 is formed with a large number of battery cells 31 connected in series, the above aspect becomes a serious problem.

If the transmission power from the management device 15 is increased, the decrease in the AC signal reading sensitivity of the IC chip 53 can be reduced. Where the management device 15 frequently communicates with a large number of battery cells 31, however, the power consumption required for the communication becomes larger, and the power of the battery device 11 to be supplied to the operating unit 13 is wasted.

In view of this, there is the need for a mechanism with which the AC signal transmitted from the management device 15 via the power lines 17 and 18 does not pass through the battery 51.

Figure 5:
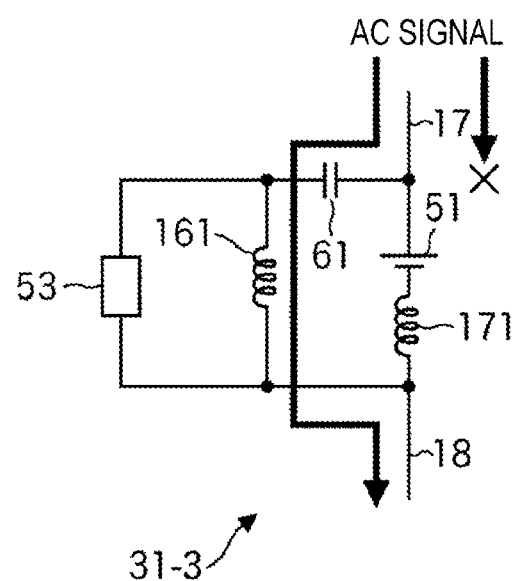
FIG. 5 is a block diagram showing a third example structure of a battery cell.

FIG. 5 shows a third example structure of a battery cell 31 having the above described mechanism. This battery cell 31-3 is the same as the second example structure, except that a coil 171 connected in series to the battery 51 is added. In the battery cell 31-3, the AC signal that is transmitted from the management device 15 via the power lines 17 and 18 does not pass through the battery 51, and can pass only through the passage on the IC chip side.

However, where the battery 51 is connected in series to the coil 171 as in the battery cell 31-3, the rising edge of the waveform of the voltage that is output from the battery 51 becomes blunt, and prompt operations cannot be operated at the operating unit 13.

Therefore, there is the need for a mechanism with which the AC signal transmitted from the management device 15 via the power lines 17 and 18 does not pass through the battery 51, and does not affect the rising edge of the waveform of the voltage that is output from the battery 51.

The capacitive and inductive properties of the battery 51 are now described prior to a description of a battery cell 31 having the above described mechanism.

Figure 6:
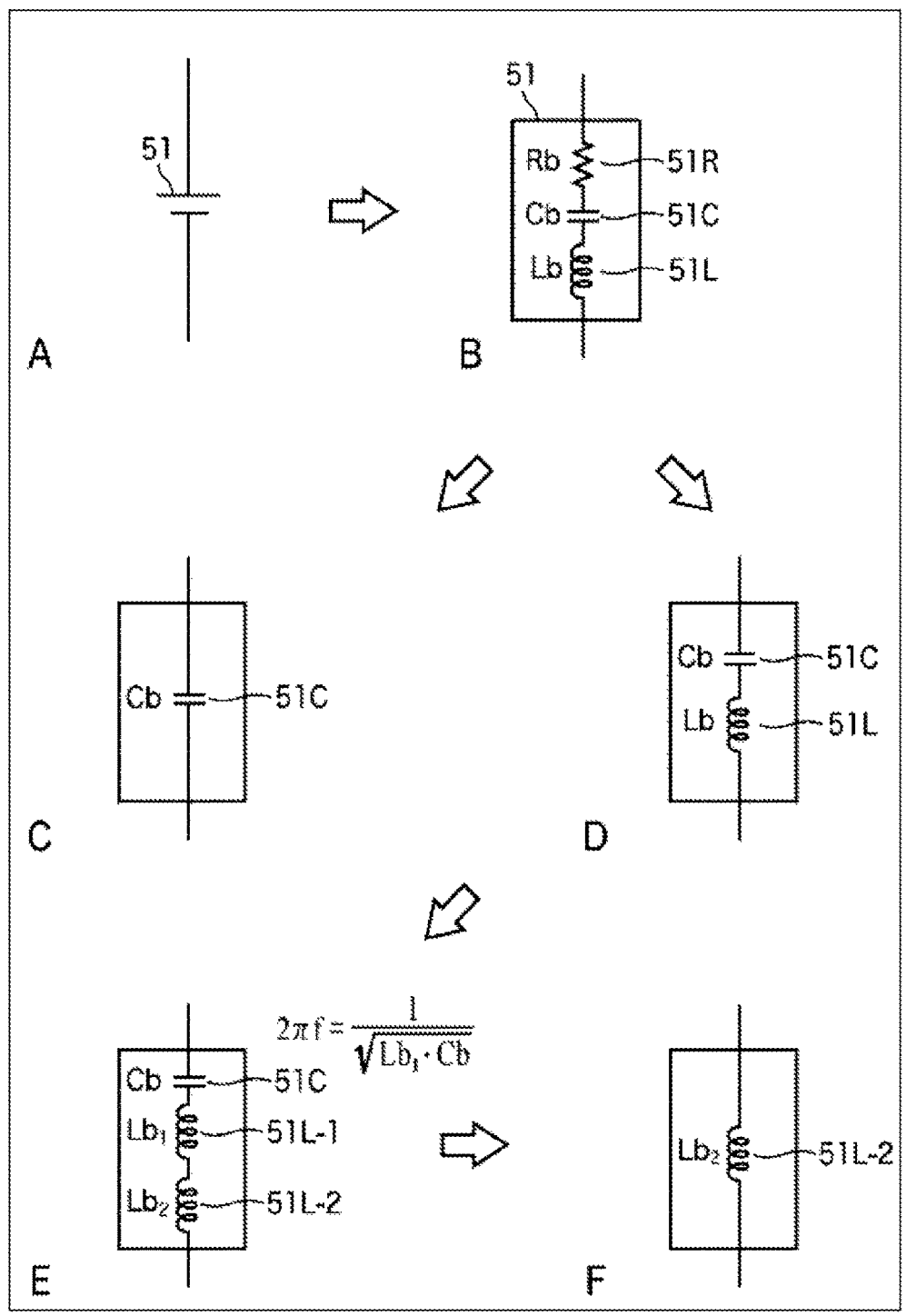
FIG. 6 is a diagram for explaining capacitive and inductive properties of a battery.

FIG. 6 is a diagram for explaining capacitive and inductive properties of the battery 51. Normally, the battery 51 can be classified as capacitive or inductive based on the relationship between the internal structure (such as the material or length of the polar plates) and the frequency f.

The equivalent circuit of the battery 51 for the AC signal at the frequency f can be regarded as a circuit formed with a resistor 51R (a resistance value Rb), a capacitor 51C (a capacitance Cb), and a coil 51L (an inductance Lb) that are connected in series, as shown in B in the drawing.

Here, the resistance value Rb of the resistor 51R is so small that it can be ignored. The inductance Lb is generated based on the relationship between the wavelength of the AC signal at the frequency f and the length of the polar plates or the like inside the battery 51. The inductance Lb can be ignored in some cases, but cannot be ignored in other cases.

When the inductance Lb is so small that it can be ignored, the battery 51 is regarded as capacitive, or the equivalent circuit of the battery 51 for the AC signal at the frequency f is regarded as the capacitor 51C, as shown in C in the drawing.

When the inductance Lb is so large that it cannot be ignored, the equivalent circuit of the battery 51 for the AC signal at the frequency f is regarded as a series connection of the capacitor 51C and the coil 51L as shown in D in the drawing.

Further, as shown in E in the drawing, the coil 51L is regarded as a series connection of a coil 51L-1 (an inductance Lb1) and a coil 51L-2 (an inductance Lb2). Further, a series connection of the capacitor 51C and the coil 51L-1 is considered to form a series resonance circuit that allows the AC signal to pass. As a result, the battery 51 is regarded as inductive, or the equivalent circuit of the battery 51 for the AC signal at the frequency f is regarded as the coil 51L-2 as shown in F in the drawing.

The following is a description of an example structure that has the above described mechanism compatible with a case where the battery 51 has capacitive properites, and an example structure that has the above described mechanism compatible with a case where the battery 51 has inductive properties.

[Fourth Example Structure of a Battery Cell]

Figure 7:
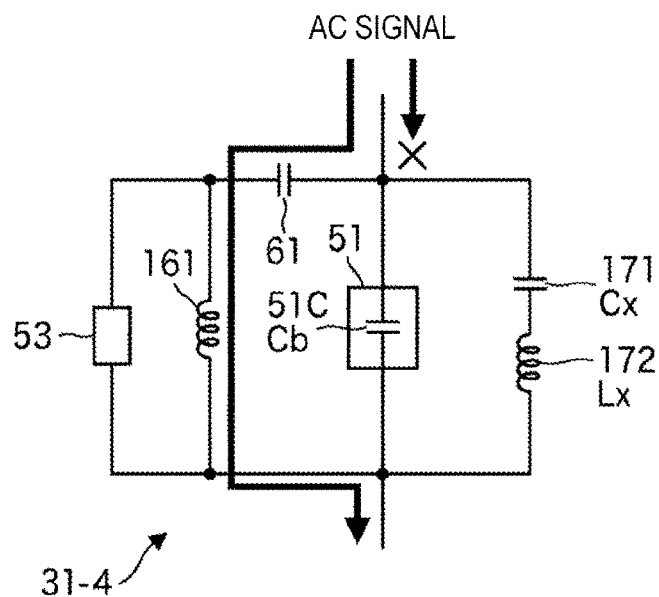
FIG. 7 is a block diagram showing a fourth example structure of a battery cell.

FIG. 7 shows a fourth example structure of a battery cell that is compatible with a case where the battery 51 has capacitive properties (or where the equivalent circuit of the battery 51 for the AC signal at the frequency f is the capacitor 51C).

This battery cell 31-4 is the same as the second example structure shown in FIG. 3, except that a series circuit formed with a capacitor 171 (a capacitance Cx) and a coil 172 (an inductance Lx) that are connected in parallel to the battery 51 is added. The other components are the same as those of the second example structure, and therefore, explanation of them will not be repeated herein.

In the fourth example structure, the series circuit formed with the capacitor 171 and the coil 172 is connected in parallel to the capacitor 51C (the battery 51), so as to function as a blocking filter that blocks the AC signal at the frequency f from flowing into the battery 51. To simply form a blocking filter, only the coil 172 may be connected in parallel to the capacitor 51C (the battery 51), and the capacitor 171 is not necessary. To prevent short-circuiting of the battery 51, however, the capacitor 171 is needed. The capacitance Cx of the capacitor 171 and the inductance Lx of the coil 172 are determined as follows.

Figure 8:
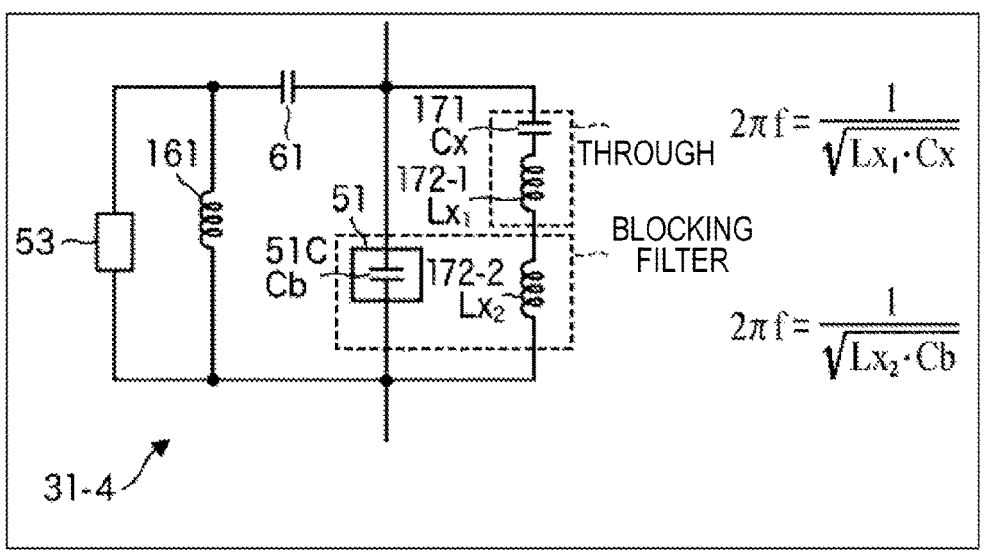
FIG. 8 is a block diagram showing the fourth example structure of a battery cell.

FIG. 8 is a circuit diagram in which the coil 172 of the fourth example structure is shown as a series connection of a coil 172-1 (an inductance Lx1) and a coil 172-2 (an inductance Lx2). As shown in the drawing, the series connection of the capacitor 171 and the coil 172-1, which satisfy the equation (2) shown below, forms a series resonance circuit that allows the AC signal at the frequency f to pass. Also, the parallel connection of the capacitor 51C and the coil 172-2, which satisfy the equation (3) shown below, forms a parallel resonance circuit that blocks the AC signal at the frequency f.

$$Lx = Lx1 + Lx2 \tag{1}$$

$$2\pi f = 1/\sqrt{(Lx1 \cdot Cx)} \tag{2}$$

$$2\pi f = 1/\sqrt{(Lx2 \cdot Cb)} \tag{3}$$

According to the equations (1) through (3), the inductance Lx is determined as shown in the following equation.

$$Lx = (Cx + Cb)/4\pi^2 f^2 \times Cx \cdot Cb \tag{4}$$

With the battery cell 31-4 as the fourth example structure of a battery cell, the AC signal transmitted from the management device 15 via the power lines 17 and 18 is blocked from flowing into the battery 51, and flows only on the IC chip side. Accordingly, a decrease in the AC signal reading sensitivity of the IC chip 53 can be prevented.

[Fifth Example Structure of a Battery Cell]

Figure 9:
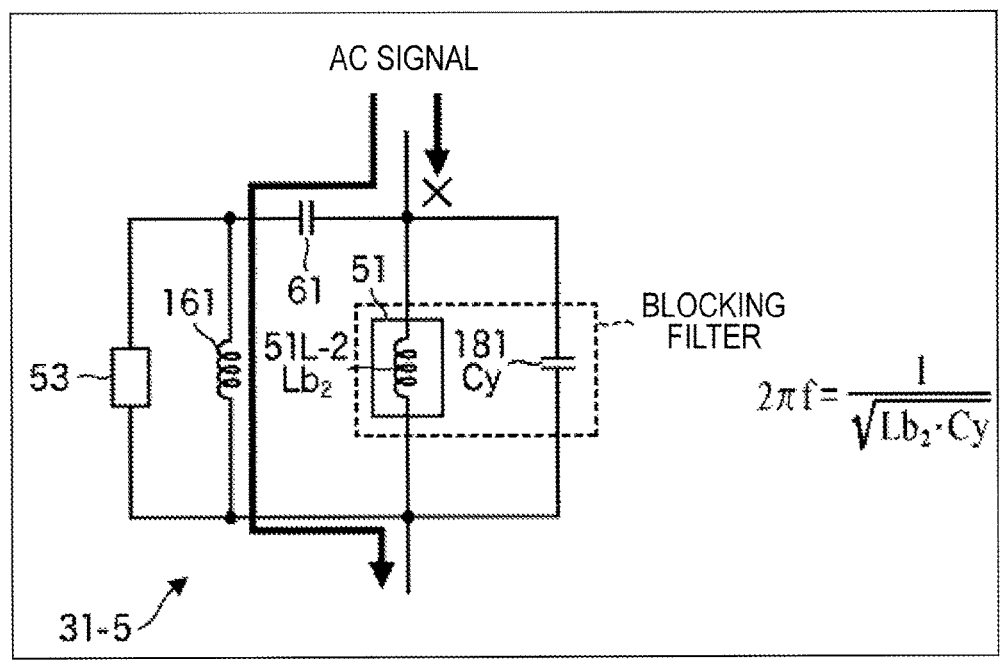
FIG. 9 is a block diagram showing a fifth example structure of a battery cell.

FIG. 9 shows a fifth example structure of a battery cell that is compatible with a case where the battery 51 has inductive properties (or where the equivalent circuit of the battery 51 for the AC signal at the frequency f is the coil 51L-2).

This battery cell 31-5 is the same as the second example structure shown in FIG. 3, except that a capacitor 181 (a capacitance Cy) connected in parallel to the battery 51 is added. The other components are the same as those of the second example structure, and therefore, explanation of them will not be repeated herein.

In the fifth example structure, the coil 51L-2 (the battery 51) and the capacitor 181 form a parallel resonance circuit, to function as a blocking filter that blocks the AC signal at the frequency f from flowing into the battery 51.

The capacitance Cy of the capacitor 181 is determined so as to satisfy the following equation (5).

$$2\pi f = 1/\sqrt{(Lb2 \cdot Cy)} \qquad (5)$$

According to the equation (5), the capacitance Cy is determined as shown in the following equation.

$$Cy = 1/4\pi 2 f 2 \times Lb2 \qquad (6)$$

With the battery cell 31-5 as the fifth example structure of a battery cell, the AC signal transmitted from the management device 15 via the power lines 17 and 18 does not flow into the battery 51, and flows only on the IC chip side. Accordingly, a decrease in the AC signal reading sensitivity of the IC chip 53 can be prevented.

The above mentioned inductance Lx of the coil 172 of the fourth example structure and the capacitance Cy of the capacitor 181 of the fifth example structure of a battery cell 31 are ideal values, and the coil 172 and the capacitor 181 having such values are not necessarily available as ready-made parts. In such a case, ready-made parts having values close to the ideal values may be used, or ready-made parts may be combined to realize the coil 172 and the capacitor 181.

In the above described fourth and fifth example structures of battery cells 31, the AC signal can be prevented from entering the battery 51, without a decrease in the angle of the rising edge of the voltage of the battery 51 or an increase in the internal resistance of the battery 51. Accordingly, the AC signal reading sensitivity of the management device 15 can be increased. As a result, even if the number of battery cells 31 provided in the battery device 11 becomes larger, the battery information about each of the battery cells 31 can be prevented from failing to be processed.

<3. Second Embodiment>
[Structure of an Electronic Apparatus]

Next, an electronic apparatus that includes the above described battery device 11 is described.

Figure 10:
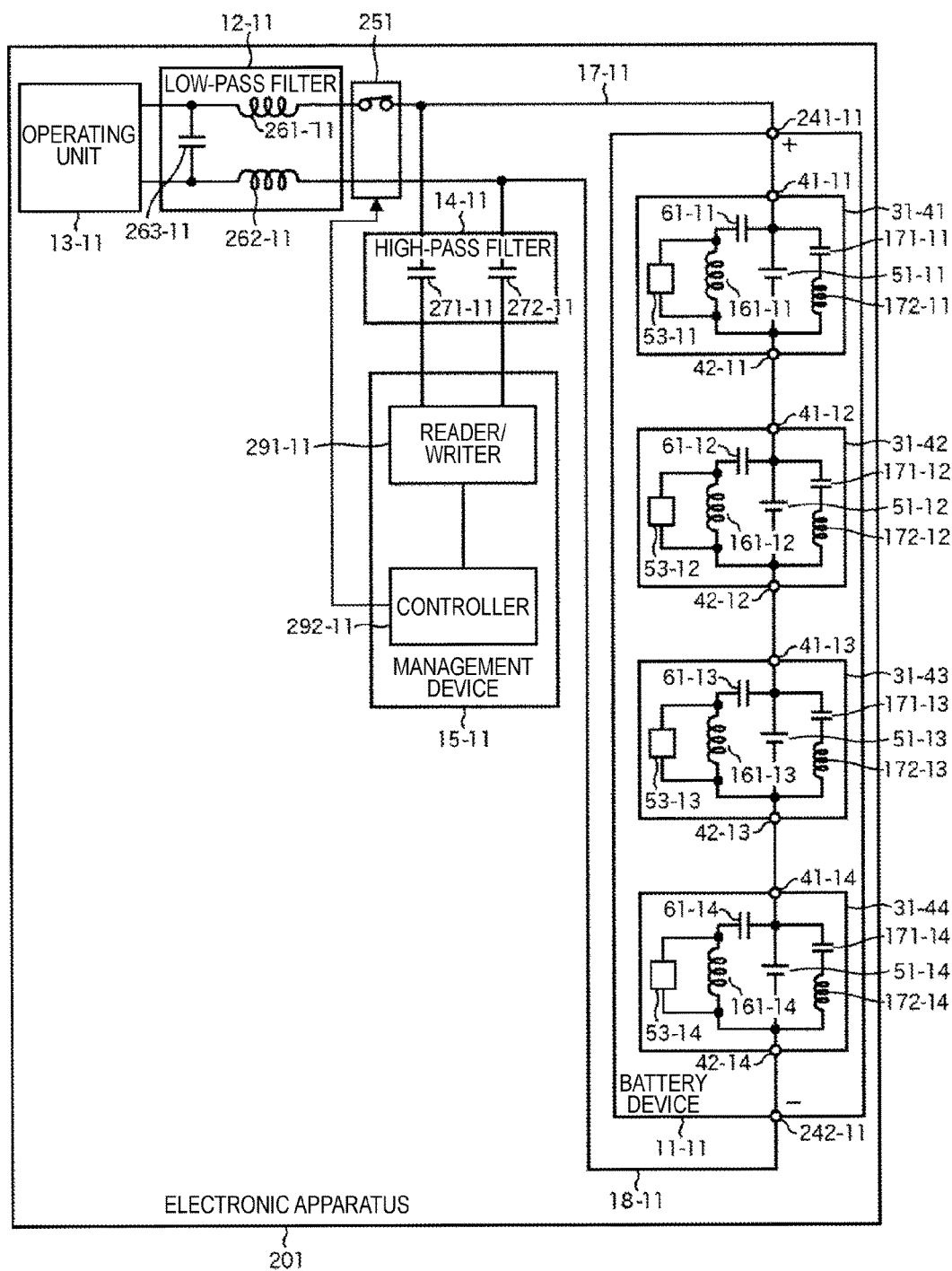
FIG. 10 is a block diagram showing an example structure of an electronic apparatus to which the present invention is applied.

FIG. 10 is a block diagram showing an example structure of the electronic apparatus that includes the battery device 11. This electronic apparatus 201 is an apparatus that operates on the electric power supplied from the battery device 11, and may be a personal computer, an electric vehicle, or the like.

The electronic apparatus 201 is formed with a battery device 11-11, a low-pass filter 12-11, an operating unit 13-11, a high-pass filter 14-11, a management device 15-11, and a switch 251.

The battery device 11-11 is formed with terminals 241-11 and 242-11, and a large number of battery cells 31-4. In the drawing, only four battery cells 31-41 through 31-44 connected in series are shown for convenience sake. The battery cells may be connected in parallel, or may have higher capacities.

The terminals 241-11 and 242-11 are terminals through which discharging current flows (or charging current flows at the time of charging).

The battery cell 31-41 has the same structure as the fourth example structure of a battery cell 31 shown in FIG. 7. That is, the battery cell 31-41 includes a battery 51-11, a capacitor 61-11 as the DC blocking unit 52, a coil 161-11 as the voltage generating unit 151, and an IC chip 53-11, and outputs DC power from terminals 41-11 and 42-11. In the battery cell 31-41, a series circuit that functions as a blocking filter to prevent the AC signal at the frequency f from flowing into the battery 51-11, and is formed with a capacitor 171-11 (a capacitance Cx) and a coil 172-11 (an inductance Lx) is further provided in parallel with the battery 51-11.

The other battery cells 31-4i (i=2, 3, and 4) each have the same structure as the battery cell 31-41.

The positive terminal 41-11 of the battery cell 31-41 is connected to the positive terminal 241-11 of the battery device 11-11, and the negative terminal 42-11 of the battery cell 31-41 is connected to the positive terminal 41-12 of the battery cell 31-42. Likewise, the positive terminal 41-13 of the battery cell 31-43 is connected to the negative terminal 42-12 of the battery cell 31-42, and the positive terminal 41-14 of the battery cell 31-44 is connected to the negative terminal 42-12 of the battery cell 31-43. The negative terminal 242-11 of the battery device 11-11 is connected to the negative terminal 42-14 of the battery cell 31-44.

The IC chips 53-11 through 53-14 of the battery cells 31-41 through 31-44 each store battery information containing the identification information thereof.

DC discharging current flows through the passage formed with a negative power line 18-11, the terminal 242-11, the terminal 42-14, the battery 51-14, the terminals 41-14 and 42-13, the battery 51-13, the terminals 41-13 and 42-12, the battery 51-12, the terminals 41-12 and 42-11, the battery 51-11, the terminals 41-11 and 241-11, and a positive power line 17-11.

The AC signal is input to the battery cell 31-41 via the positive power line 17-11 and the terminals 241-11 and 41-11. The AC signal at the frequency f that is input to the battery cell 31-41 does not flow into the battery 51-11 by virtue of the blocking filter, but flows into the capacitor 61-11, the coil 161-11, and the IC chip 53-11.

The AC signal that has passed through the battery cell 31-41 then flows through the battery cells 31-42, 31-43, and 31-44, and is output from the terminal 242-11. The AC signal of course flows through the above described passage in reverse order.

The low-pass filter 12-11 is formed with coils 261-11 and 262-11 inserted to the power lines 17-11 and 18-11, respectively, and a capacitor 263-11 connected between the power lines 17-11 and 18-11.

The high-pass filter 14-11 is formed with a capacitor 271-11 inserted to a positive line branching from the power line 17-11, and a capacitor 272-11 inserted to a negative line branching from the power line 18-11.

The management device 15-11 is formed with a reader/writer 291-11 and a controller 292-11. The reader/writer 291-11 communicates the AC signal at the frequency f to and from the battery cells 31-41 through 31-44, and the IC chips 53-11 through 53-14. The controller 292-11 controls the reader/writer 291-11 and the switch 251.

Specifically, the controller 292-11 performs authenticating operations on the battery cells 31-41 through 31-44 based on the battery information about the battery cells 31-41 through 31-44 acquired by the reader/writer 291-11, and turns on the switch 251 only after determining that the battery cells 31-41 through 31-44 are authentic. When the battery cells 31-41 through 31-44 are determined not to be authentic, on the other hand, the switch 251 is turned off. With the above described electronic apparatus 201, the AC signal reading sensitivity of the management device 15 can be increased. The electric power from the battery device 11-11 is supplied to the operating unit 13-11 only when the battery cells 31-41 through 31-44 are authentic. Further, as the AC signal does not flow into the battery 51, high sensitivity to communications with the reader/writer 291-11 and the IC chips 53-11 through 53-14 can be maintained, without an increase in transmission power for the AC signal. Accordingly, power consumption by the reader/writer 291-11 can be reduced.

<4. Modifications>

In the electronic apparatus 201 shown in FIG. 10, the battery device 11-11 is formed with the battery cells 31-4 each having the fourth example structure of a battery cell 31. However, the battery device 11-11 may be formed with battery cells 31-5 each having the fifth example structure of a battery cell 31.

Also, secondary batteries that can be charged are used as the batteries in the above examples. In a case where only discharging current is used, however, the present invention can be applied to primary batteries that cannot be charged.

It should be noted that embodiments of the present invention are not limited to the above described embodiments, and various modifications may be made to them without departing from the scope of the invention.

REFERENCE SIGNS LIST

1 Electronic apparatus
11 Battery device
12 Low-pass filter
13 Operating unit
14 High-pass filter
31 Battery cell
51 Battery
52 DC blocking unit
53 IC chip
151 Voltage generating unit
171 Capacitor
172 Coil
181 Capacitor
201 Electronic apparatus
251 Switch

The invention claimed is:

1. A battery device, comprising:
at least one battery cell including:
  a battery element configured to output DC power via a power line;
  an integrated circuit (IC) chip connected in parallel to the battery element,
  wherein the IC chip is configured to:
    store identification information of the at least one battery cell;
    receive an AC signal via the power line;
    generate electric power based on load modulation of the AC signal; and
    output the identification information of the at least one battery cell based on the electric power; and
  a blocking filter, connected in parallel to the battery element, wherein the blocking filter is configured to block input of the AC signal to the battery element.

2. The battery device according to claim 1, wherein
an equivalent circuit of the battery element for the AC signal is a first capacitor which has a capacitance C1, and
the blocking filter comprises a series circuit of a second capacitor which has a capacitance C2 and a first coil which has an inductance L1.

3. The battery device according to claim 2, further comprising:
a series resonance circuit and a parallel resonance circuit,
wherein the first coil comprises a series connection of a second coil which has an inductance L11 and a third coil which has an inductance L12,
wherein the series resonance circuit comprises the second capacitor and the second coil,
wherein the series resonance circuit satisfies $2\pi f=1/\sqrt{(C2 \cdot L11)}$, and
wherein the parallel resonance circuit comprises the first capacitor and the third coil,
wherein the parallel resonance circuit satisfies $2\pi f=1/\sqrt{(C1 \cdot L12)}$, and
wherein f is a frequency of the AC signal.

4. The battery device according to claim 1, wherein
an equivalent circuit of the battery element for the AC signal is a first coil which has an inductance L1, and
the blocking filter comprises a first capacitor which has a capacitance C1.

5. The battery device according to claim 4, further comprising:
a parallel resonance circuit comprising the first coil and the first capacitor,
wherein the parallel resonance circuit satisfies $2\pi f=1/\sqrt{(L1 \cdot C1)}$, and
wherein f is a frequency of the AC signal.

6. A battery management method, comprising:
in at least one battery cell that includes, a battery element, an integrated circuit (IC) chip connected in parallel to the battery element, and a blocking filter:
  outputting DC power from the battery element via a power line;
  storing, by the IC chip, identification information of the at least one battery cell;
  receiving, by the IC chip, an AC signal via the power line;
  generating, by the IC chip, electric power based on load modulation of the AC signal;
  outputting, by the IC chip, the identification information of the battery cell, based on the electric power; and
  blocking, by the blocking filter, an input of the AC signal to the battery element.

7. An electronic apparatus, comprising:
a battery device comprising at least one battery cell, wherein the battery cell includes:
  a battery element configured to output DC power via a power line;
  an integrated circuit (IC) chip connected in parallel to the battery element,
  wherein the IC chip is configured to:
    store identification information of the at least one battery cell;
    receive an AC signal via the power line;
    generate electric power based on load modulation of the AC signal; and
    output the identification information of the at least one battery cell based on the electric power; and
  a blocking filter connected in parallel to the battery element, wherein the blocking filter is configured to block the AC signal to the battery element;
an operating unit configured to operate by the DC power from the battery device; and
a management device configured to:

acquire the identification information of the at least one battery cell based on communication of the AC signal to and from the IC chip via the power line; and control the DC power from the battery device to the operating unit, based on the identification information of the at least one battery cell.

8. The battery device according to claim 1, further comprising a DC blocking unit configured to block input of the DC power to the IC chip.

9. The battery device according to claim 1, wherein the identification information comprises authentication information of the at least one battery cell.

10. The battery device according to claim 1, further comprising a parallel resonance circuit that includes the blocking filter and the battery element.

11. The battery device according to claim 10, wherein the battery element in the parallel resonance circuit is a capacitive battery.

12. A battery device, comprising:
at least one battery cell including:
a battery element configured to output DC power via a power line, wherein an equivalent circuit of the battery element for an AC signal is a first capacitor having a capacitance C1;

an integrated circuit (IC) chip connected in parallel to the battery element, wherein the IC chip is configured to:
store identification information of the at least one battery cell;
receive the AC signal via the power line;
generate electric power based on load modulation of the AC signal; and
output the identification information of the at least one battery cell based on the electric power; and a blocking filter, connected in parallel to the battery element, wherein the blocking filter comprises a series circuit of a second capacitor having a capacitance C2 and a first coil having an inductance L1, and wherein the blocking filter is configured to block input of the AC signal to the battery element.

* * * * *